United States Patent [19]

Dempsey

[11] 4,372,439

[45] Feb. 8, 1983

[54] ELECTRONIC CONVEYOR CONTROL APPARATUS

[76] Inventor: Guy C. Dempsey, 2197 Mayflower Dr., Woodbridge, Va. 22192

[21] Appl. No.: 210,463

[22] Filed: Nov. 25, 1980

[51] Int. Cl.³ ............................................ B65G 43/08
[52] U.S. Cl. .................................. 198/470; 198/572; 198/856
[58] Field of Search ............... 198/460, 322, 465–468, 198/469, 470, 572, 575, 577, 857, 856, 358, 502

[56] References Cited

U.S. PATENT DOCUMENTS

| 1,438,112 | 12/1922 | Hendricks | 198/322 |
| 1,985,563 | 12/1934 | Fitzgerald | 198/857 |
| 3,011,621 | 12/1961 | Byrnes et al. | 198/358 |
| 3,187,878 | 6/1965 | Harrison et al. | 198/469 |
| 3,294,037 | 12/1966 | Hoag et al. | 198/460 |
| 4,227,607 | 10/1980 | Malavenda | 198/460 |
| 4,240,538 | 12/1980 | Hawkes et al. | 198/466 |

*Primary Examiner*—Joseph E. Valenza

*Attorney, Agent, or Firm*—Theodore Major; Donald S. Lilly

[57] ABSTRACT

An improved conveying apparatus and an electronic control module for conveying systems is disclosed. The conveying apparatus includes two or more belt conveyors operating in tandem and is controlled by separate electrical circuits so that each conveyor in the system operates independently and on automatic demand of a given or preset response. The electrical control for the conveying system includes a timer which is adapted to time each object being conveyed to transverse the length of the conveyor and to stop the conveyor when the object is not present along the length of the belt. The timed circuitry further includes a memory function so that if a conveyor stops for any reason, it will restart and operate for the unexpired segment of the time required to provide a total cycle. This assures that the object being conveyed is never left on a conveyor belt unintentionally and eliminates all unnecessary operation or running of the conveyors.

5 Claims, 5 Drawing Figures

ELECTRONIC CONVEYOR CONTROL APPARATUS

BACKGROUND OF THE INVENTION

1. Field of the Invention

The present invention relates to conveyor systems and, more particularly, to an improved conveying apparatus and an electronic module that automatically controls the conveyor in response to certain preselected or preset conditions.

2. Description of the Prior Art

As known in the art, conveying systems of the type which comprise, for example, an endless belt adapted to convey an object from one point to another, often run continually irrespective of the frequency of the supply of the objects to be carried or even when t here is no object on the conveyor itself. Such a practice, although somewhat common, involves a substantial waste of electrical energy. In recent years, various proposals have been made to provide electrical control systems for escalators, conveyors and similar apparatus whereby the conveyors are controlled such that they stop and start automatically in response to an object being placed on or removed from the system. A specific example of such a prior known technique is disclosed in U.S. Pat. No. 1,985,563. While such proposals have been made, in general, no known conveying system has proved to be entirely satisfactory relative to the conversation of electrical energy for industrial multibelt conveying systems. The present invention overcomes this deficiency of the prior art.

SUMMARY OF THE INVENTION

In summary, the present invention is directed to a conveying apparatus and an unique electronic module for automatically controlling conveying systems. In its broadest aspect, the present invention provides an automatically controlled conveying apparatus that may be used, for example, for handling various objects, such as sacked mail, loose parcels, letter mail, or the like. The conveying apparatus comprises, and again broadly speaking for the moment, two or more belt conveyors operated in series, that is, two or more conveyor belts operating in tandem to move the material being conveyed from one point to another, with each conveyor in the system being controlled by separate electrical circuits so that each conveyor operates independently and on automatic demand of or by a preset response. In this manner, unnecessary operation or running of each conveyor is eliminated. The electrical circuits of the invention include, as will be discussed in detail hereinafter, timing and control circuitry which is adapted to time each object, i.e., a sack or parcel of mail, to transverse the length of the conveyor and to stop the conveyor when an object is not present along the length of the belt. The timed circuitry further includes a memory so that if a conveyor stops for any reason, it will, upon restart, operate for the unexpired segment of the time required to provide a total cycle. In other words, the circuitry will retain memory and upon restart, the conveyor would run for the unexpired portion of the preset time cycle. This function assures that the item being conveyed is never left on a conveyor belt unintentionally.

It is accordingly a general object of the present invention to provide an improved conveying system having a novel electronic module that automatically controls the operation of the conveyor in response to certain preset conditions.

A further object is to provide an improved conveying system that is particularly adopted for handling mail and which operates on automatic demand so that all unnecessary running of each conveyor in the system is eliminated.

Another object is to provide an automatic electronic control for conveying systems.

A further object is to provide a control module for conveyors wherein the conveyor once started in response to an object to be carried, will restart and run for any unexpired portion of its preset time cycle should said conveyor be stopped due to any interruption of the system.

Yet still another object is to provide an electrical control for conveying systems which substantially reduces the energy required for the running of the conveyors, prolongs the useful life of the equipment, reduces the overall maintenance thereof and lowers the noise level associated with such apparatus.

BRIEF DESCRIPTION OF THE DRAWINGS

The manner in which the foregoing and other objects are achieved in accordance with the present invention will be better understood in view of the following detailed description and accompanying drawings wherein.

DETAILED DESCRIPTION OF PREFERRED EMBODIMENTS

As briefly noted above, the present invention is directed to an improved conveying system and an unique electronic module designed to control conveying systems such that each conveyor in the system operates independently on automatic demand.

Figure 1:
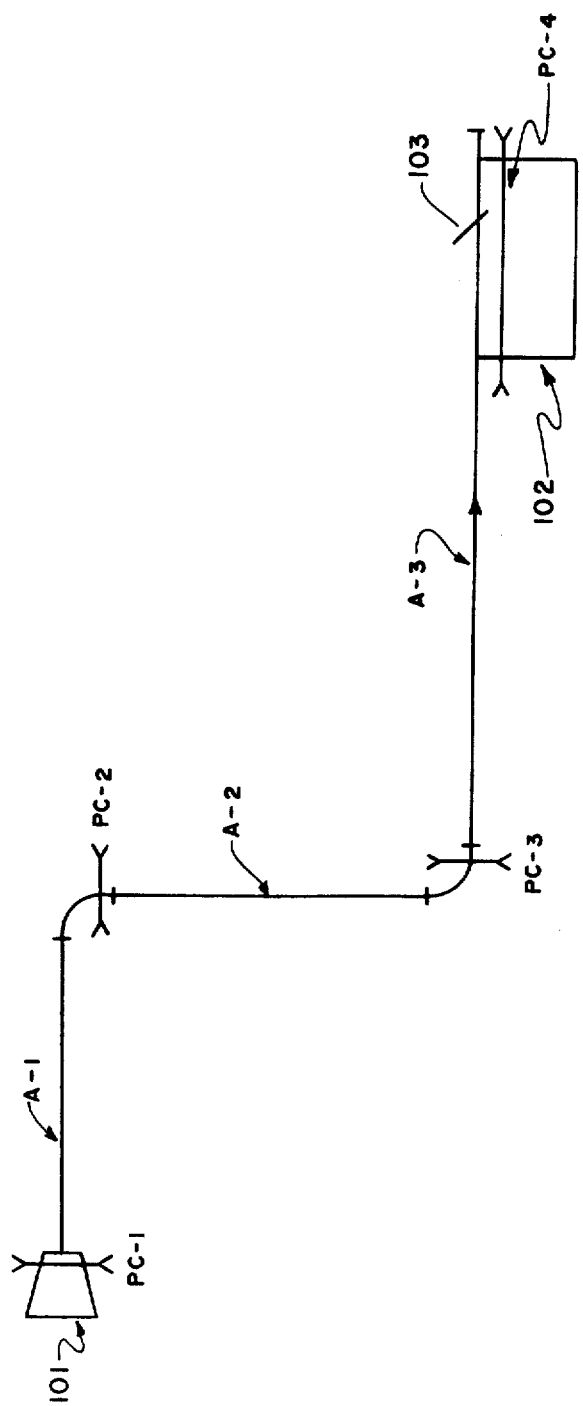
FIG. 1 is a top plan view schematically illustrating a conveying mechanism comprising three conveyors operating in series and which represents a particularly advantageous arrangement of apparatus suitable for use in the practice of the present invention.

In this regard and with reference now to the drawings, FIG. 1 illustrates a particularly advantageous apparatus embodiment that may be employed in the practice of the invention and which includes three separate conveyors, indicated as A-1, A-2 and A-3 which are adapted to transport various materials such as mail, from an initial inlet hopper or chute 101 to an outlet or receiving station 102. The conveyors may be of any suitable type as is well known in the art, but preferably are of the endless belt type having suitable drive pulleys, support and/or tension rollers and the like. The inlet chute 101 may comprise an inclined hopper but may be of any known construction as is well known in the art. A traveling deflection plate 103 is provided and positioned near the end of the conveyor A-3 so as to direct the various items, e.g., mail sacks, envelopes, etc.

onto the receiving station 102. The receiving station may include or comprise sorting equipment or other known means for processing the items being cnveyed. As should be readily apparent to those skilled in the art, any number of belts may be operably disposed or employed in the overall system, conveyors A-1, A-2, A-3 being shown only for illustrative purposes.

Figure 2:
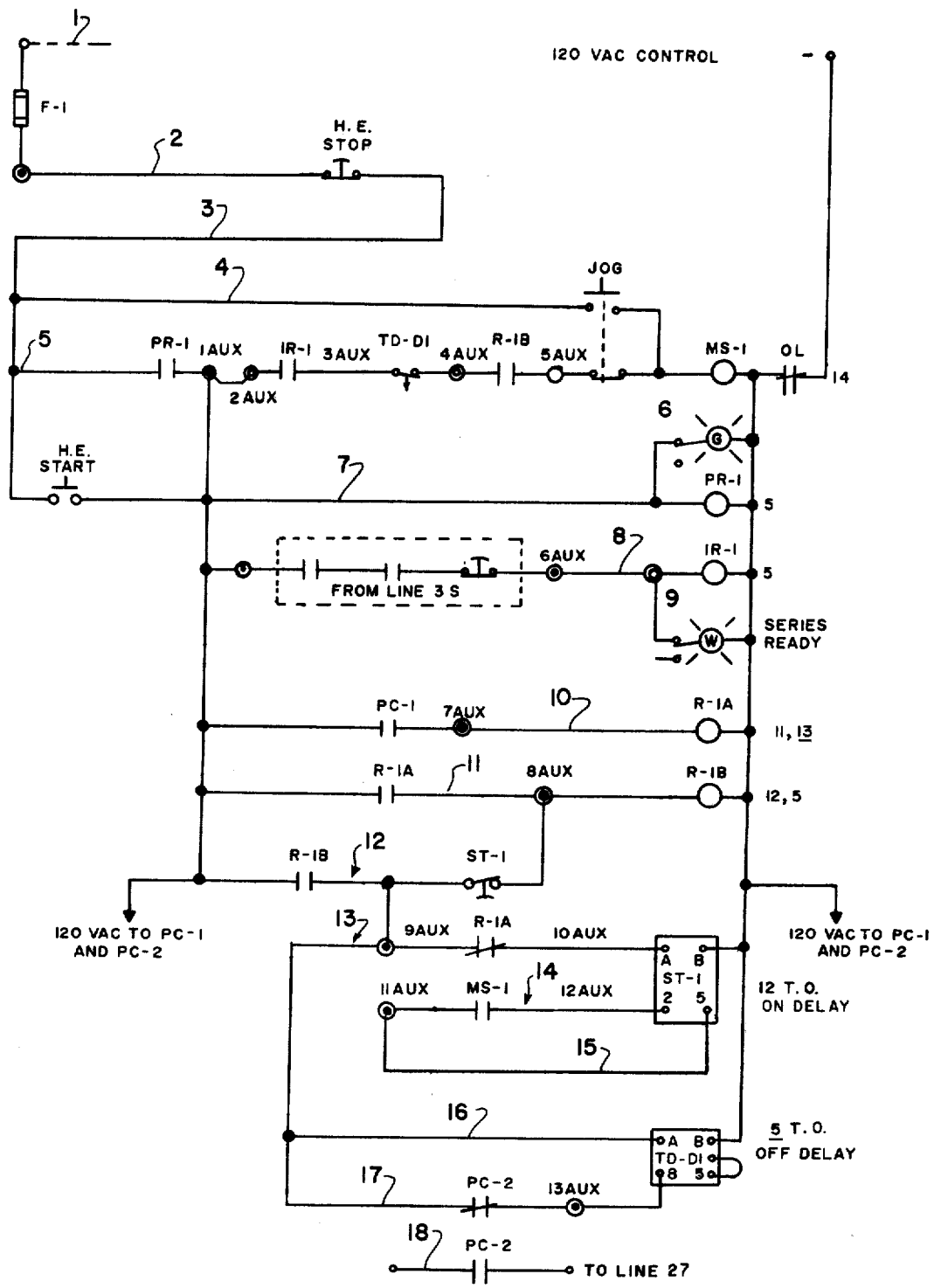
FIGS. 2, 3 and 4 are electrical circuits which control the conveying mechanism illustrated in FIG. 1. The electrical circuit in FIG. 2 is associated with and controls the first conveyor indicated at A-1 in FIG. 1. The electrical circuit in FIG. 3 is associated with and controls the second conveyor indicated at A-2 in FIG. 1. The electrical circuit in FIG. 4 is associated with and controls the third conveyor indicated at A-3 in FIG. 1.
Figure 3:
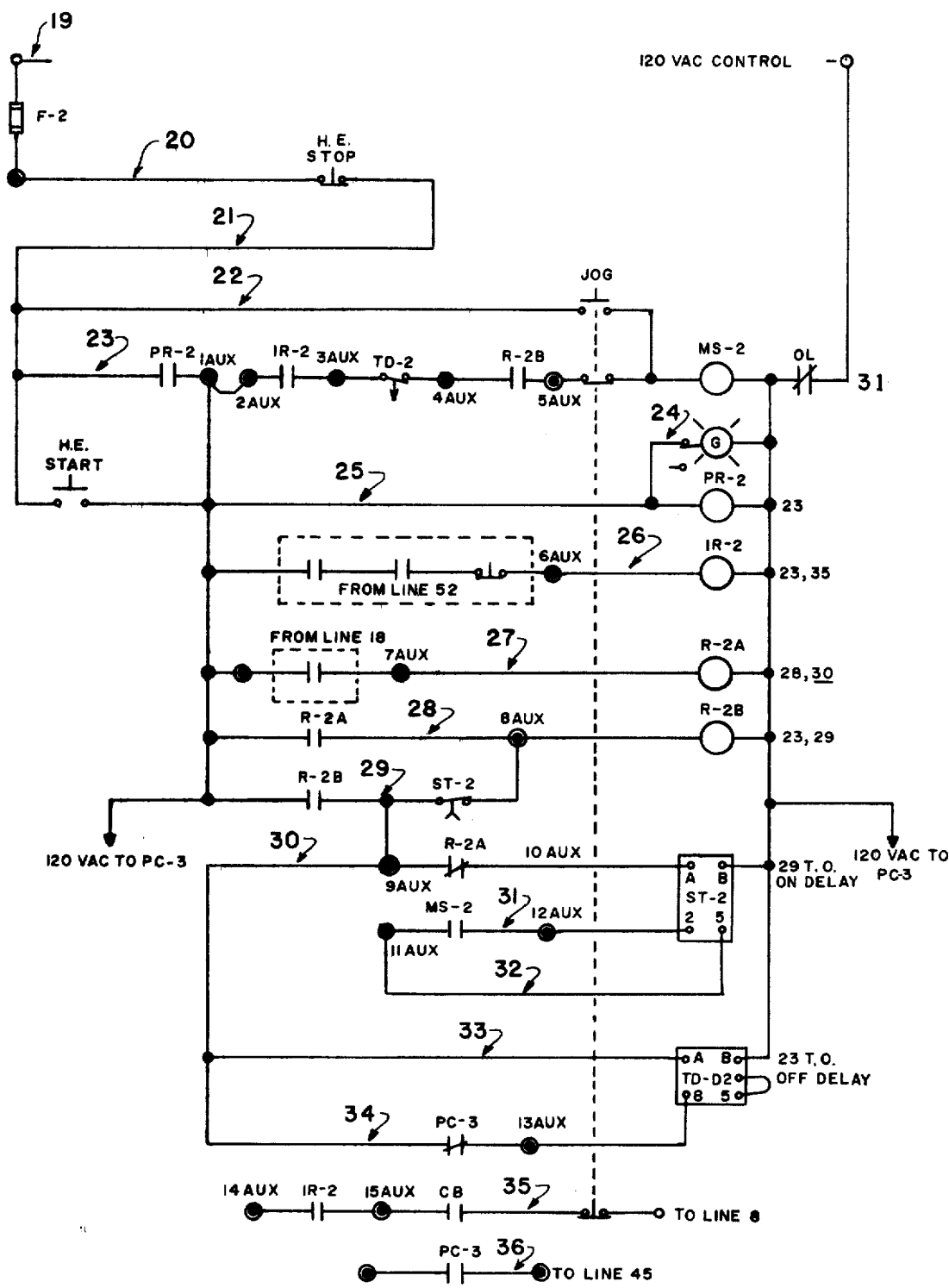
Figure 4:
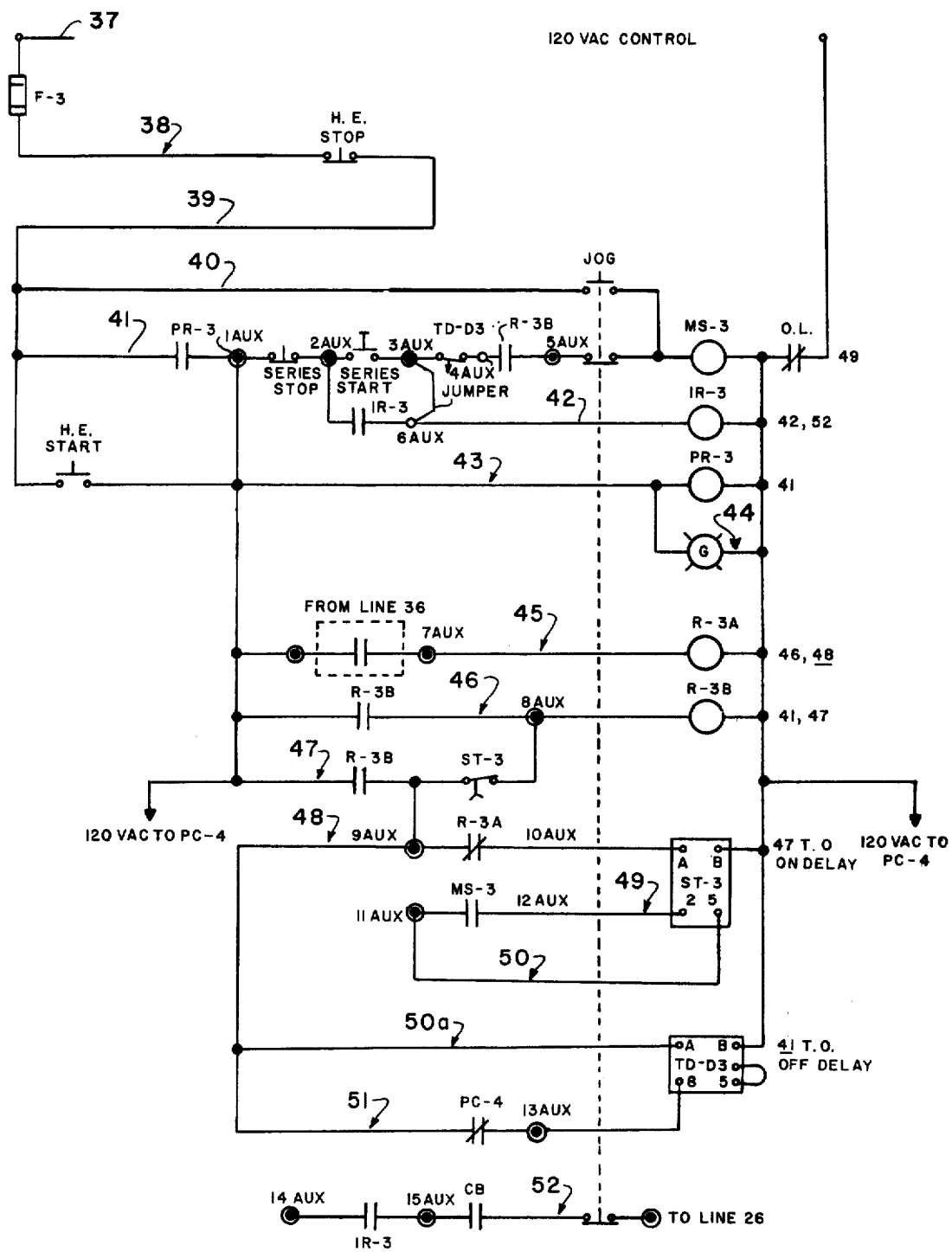
Figure 5:
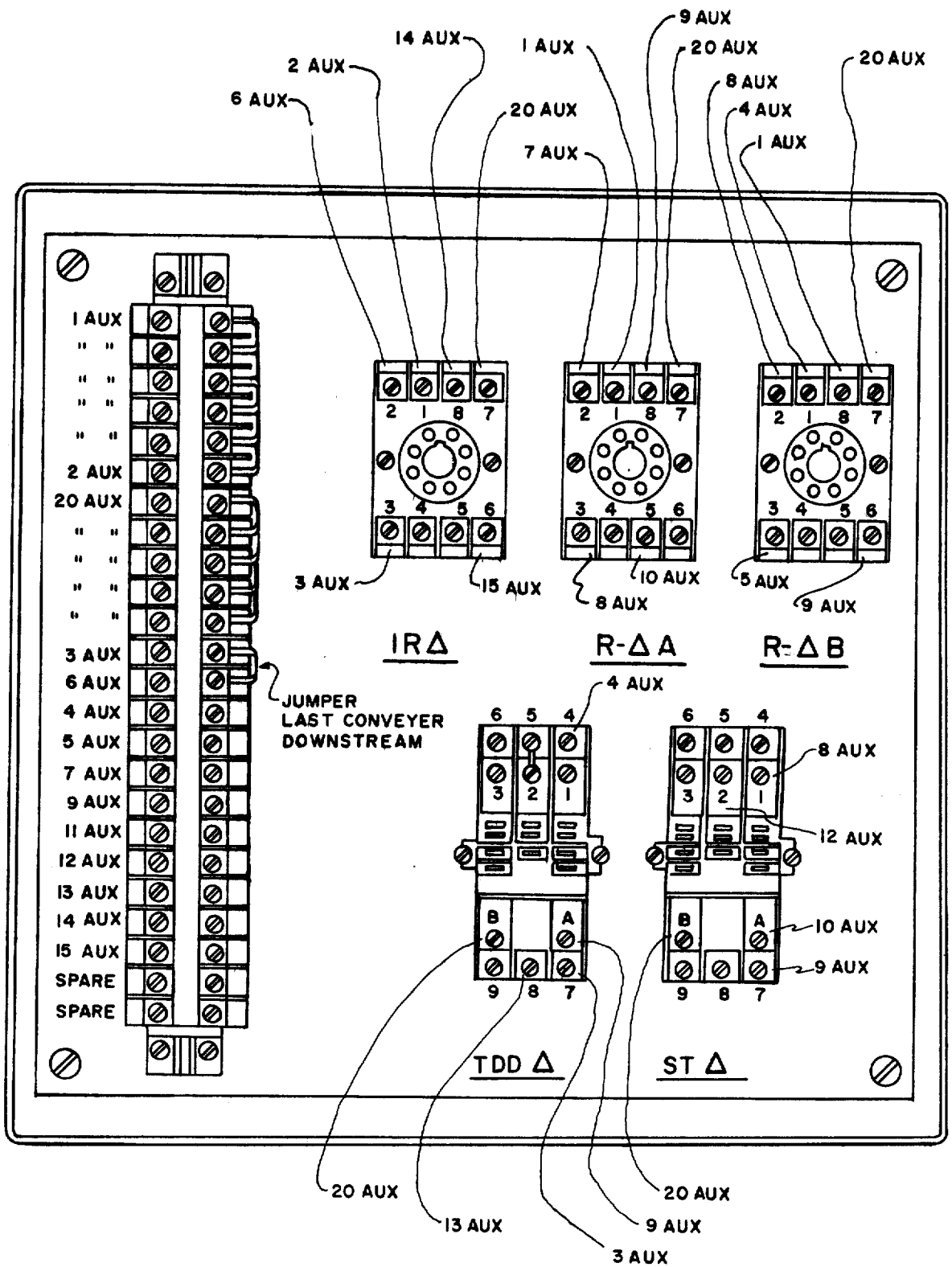
FIG. 5 is a pictorial construction drawing for fabricating and wiring the electronic control module of the invention.

In accordance with a particularly advantageous embodiment of the invention, and with reference now to FIGS. 1-5, the circuitry for controlling the three conveyors is divided into three separate circuits illustrated in FIGS. 2, 3 and 4. The circuitry shown in FIG. 2 controls the conveyor mechanism associated with the first conveyor A-1, whereas the circuitry shown in FIGS. 3 and 4 controls the mechanism associated with conveyors A-2 and A-3 respectively. All three circuits are tied together and operably interrelated since the overall conveyor functions are correlated so that the three circuits represent a single control means for the entire conveying apparatus. FIG. 5 represents a single module for each of the three circuits shown in FIGS. 2-4, i.e., each conveyor will have an identical module. In FIG. 5, the symbol Δ represents the individual components of the three circuits, i.e., 1RΔ=1R-1, 1R-2, and 1R-3 of FIGS. 2, 3 and 4, respectively. The relay sockets shown in FIG. 5 are for construction and wiring purposes and may accommodate standardized relays available from known manufacturers.

As shown in FIG. 1, photosensors PC-1, PC-2 and PC-3 are provided or positioned at the inlet or forward ends of conveyors A-1, A-2 and A-3 respectively. A back-up photosensor PC-4 is also positioned at the receiving station 5 as shown in FIG. 1. Photosensors PC-1, 2 and 3 are adapted, by way of and through the electrical circuits shown in FIGS. 2-4, to operate the starting contacts of the motors employed for each conveyor, this operation being in response to a change in condition initiated by the approach of the item or items to be conveyed. Each photosensor would preferably be powered (120 VAC) by the nearest conveyor drive panel of the series. See FIGS. 2, 3 and 4. As should be apparent, additional photosensors could be employed, as for example, where a conveyor receives mail or other materials from more than one source, i.e., merging lines and the like. In this case, the photosensor output relay contact would be wired parallel with the photosensor contacts shown on lines 10, 27 or 45 in FIGS. 2, 3 and 4, respectively. While the precise location of the photosensors could be varied and adjusted following an initial start up of the conveying system, it has been discovered that preferred results are obtained when the photosensors are located on the transfer chutes and not across the conveyor belts. As will be discussed in more detail hereinbelow, the photosensors shown as PC-2 and PC-3 serve two functions. In addition to providing the signal to start conveyors A-2 and A-3, these photosensors also provide a signal which initiates the jam protection circuitry.

It may be noted at this point that, and relative for the moment to the component parts of the electrical circuits, the timing devices, indicated at ST-1, ST-2 and ST-3 in FIGS. 2, 3 and 4, respectively, are used in the conveyor circuits to time each parcel or object being conveyed to traverse the length of the conveyor and to shut down the conveyor when no object is present along its length. Due to the memory or inhibit feature (which provides for time accumulation), each timer, should a conveyor be caused to stop for conditions downstream, would hold its accumulated time and, after such conditions are cleared, would resume its timing function for the unexpired segment of time required to provide a total cycle. This time cycle would be repeated for each interruption and remake of the photosensor at the inlet end of each respective conveyor. While the timers may comprise synchronous motor driven timing devices, in a preferred mode of the invention, the timers comprise solid state devices. Such apparatus are commercially available being sold, for example, by the Automatic Timing and Controls Company of Pennsylvania, a division of American Manufacturing Company, Inc. In summary, this device is a solid state timer which uses the line frequency as a base for timing intervals of 0.01 seconds to 99.99 minutes. Line frequency is counted, decoded and compared to the settings of BCD switches by integrated circuity. As will be apparent from the above, the photosensors, timing devices, as well as the further component parts of the control circuitry of the invention, such as the electrical relays and associated outputs, are commercially available and known in the art.

Further details of the electrical circuitry of the invention as well as the interrelationship of the individual components thereof will be evident from the following description. In this regard and with reference to FIG. 4, the closure of the systems series start button, line 41, energizes interlock relay 1R-3, line 42, which seals in through normally open IR-3 contact, line 42. This action will initiate a sequence which will put the conveyors in readiness to respond to input signals from the initiating photosensors PC-1, PC-2 and PC-3. Normally open contact IR-3, line 52 closes to energize IR-2, line 26, FIG. 3. Normally open IR-2 contact line 23 closes to set up permissive circuit for conveyor A-2 and normally open contact IR-2, line 35 closes to energize IR-1, line 8, FIG. 2. Normally open contact IR-1, line 5 closes to set up permissive circuit for conveyor A-1 and the Series Ready Light, line 9 is illuminated. The series is now ready for operation, however, the conveyors do not start until their respective photosensor beams are interrupted or blocked. This ready circuitry is significant inasmuch as it provides for positive control of the conveyors. Since the conveyors cannot respond to the photosensors until the ready circuit is activated, it gives positive control of the circuit. This circuit also provides a key safety feature in that the conveyors are series interlocked through this ready circuit. The operation of a safety device, such as a safety limit switch on a conveyor, or the pressing of an individual conveyor stop pushbutton, will prevent all upstream conveyors from running and feeding material to a problem area. This provides protection to material and equipment in addition to protecting maintenance personnel.

With the permissive circuit established, interruption of photosensor PC-1 causes normally open PC-1 contact line 10 to close energizing relay R-1A. Normally open R-1A contact line 11 closes to energize relay R-1B which seals in through R-1B normally open contact line 12 and the normally closed time contact ST-1, line 12. Normally closed R-1A contact line 13 opens causing timer ST-1 to reset to its zero condition and normally open R-1B contact line 5, closes to energize motor starter MS-1 and to start the motor (not shown) for conveyor A-1. If no further interruptions of PC-1 occur, timer ST-1 will time the conveyed material to the head end of conveyor A-1 and open the normally closed ST-1 contact line 12, dropping out relay R-1B.

Normally open R-1B contact line 5 will open to stop conveyor A-1.

In operation and assuming a constant flow of material onto the inlet or leading end of conveyor A-1, each interruption of photosensor PC-1 will energize relay R-1A, causing the normally closed R-1A contacts line 13 to momentarily open resetting timer ST-1. This will retime the conveyor for each piece or segment of material entered onto conveyor A-1. If, during this normal operation the conveyor series is stopped, from the series stop pushbutton, line 41, FIG. 4; or conveyor A-1 is stopped for other reasons downstream, such as loss of preset on conveyor A-2, etc., the Special Timer ST-1 will retain memory and upon restart cause A-1 to run for the unexpired portion of its preset time cycle. This function will insure that material is never left on a conveyor unintentionally. Interruption of the photosensors PC-2 and PC-3 will cause the above sequence to be repeated for the corresponding circuitry for conveyors A-2 and A-3, respectively.

From the above it will be seen that the electric control means of the invention comprises separate electrical circuits for each conveyor and timing means in operative electrical association with each of said circuits, the separate circuits being operably interrelated so that the overall functions of the conveying systems are correlated and represent a single control means. The individual photosensors (e.g., PC-1, PC-2, etc.) are adapted through the electric circuits to operate the starting contacts of the electric power means (i.e., motor and motor starter) for each of the circuits in response to a change in condition initiated by the approach of the object to be conveyed, the timers are adapted, through said electric circuits, to time each object being conveyed to traverse the length of the conveyor and to shut down the conveyor when the object has traversed its length. The timing means further include, in operative relationship with said electrical circuits, a memory providing for time accumulation such that, should a conveyor be caused to stop in response to an electrical function in the circuits created by a change in condition in the conveying system, each timer would hold its accumulated time and, after such conditions are cleared, would resume its time function for the unexpired segment of time and cause the conveyor to restart and to run for the unexpired portion of the preset time function.

In this regard it may be noted that time delay relays TD-D1, TD-D2 and TD-D3 provide jam protection for the conveyors A-1, A-2 and A-3. When PC-2 is continuously blocked (normally closed PC-2 line 17 open) for a sufficient length of time for TD-D1 to time open, TD-D1 contact, line 5, will open stopping conveyor A-1. In other words, if the beam of PC-2 is not restored before the time out of the time relay TD-D1 (this time out normally being set for about 5 to 10 seconds), then the contact TD-D1 will open stopping A-1. This sequence would be repeated for conveyors A-2 and A-3 by way of the illustrated circuitry for these two conveyors.

The circuitry illustrated in FIGS. 2-4 includes a preset relay control and a jog function, these functions representing safety and maintenance provisions. The jog button for any conveyor, as shown at lines 4, 22 and 40 in FIGS. 2, 3 and 4 respectively, is designed such that when pressed it starts only its own conveyor. Also, when released, it is not necessary to press a start button to return the conveyor to the interlocked condition so that it can respond to remote controls, except when the conveyor head end (HE) stop button has been pressed. As will be seen from FIGS. 2, 3 and 4, pressing the head end stop button of any conveyor serves, in addition to stopping this conveyor, to also stop any feeding conveyor while permitting all take-away conveyors to run. It is then necessary to press the conveyor start button, on the conveyor originally stopped, to restore control to the remote controls. As will be seen from the circuitry of FIGS. 2, 3, and 4, the jog function is wired in series with the head end stop button. A typical conveyor series will consist of three-phase AC motors. Circuit breakers, motor overload, and associated hardware (not shown) would also be provided as known in the art. In the embodiment illustrated in FIG. 1, the auxiliary contact of the circuit breaker of a take-away conveyor would be wired to open the interlock circuit from a feeding conveyor when the circuit breaker of the take-away conveyor is opened. This auxiliary contact is shown as "CB" on lines 35 and 52, respectively.

As a further illustration and example of the present invention, a series of tests were conducted at three General Mail Facilities, these tests consisting of installing running time meters on three conveyors at each site and recording the actual run time on a daily basis for approximately 30 days. Following this period the control circuit for each conveyor was modified by the installation of the circuitry and following the construction panel as shown in FIGS. 1-5. Time readings were again recorded for an equal number of days. The results of these tests are shown in Table 1.

TABLE 1

| Site | Conveyor System Designation | Days Monitored Before | Days Monitored After | Run Hours Before | Run Hours After | Hours Saved |
|---|---|---|---|---|---|---|
| 1 | 4E | 30 | 30 | 226.8 | 61.6 | 165.2 |
| 1 | 3X8C | 30 | 30 | 656.0 | 290.0 | 366.0 |
| 2 | F-6 | 30 | 30 | 502.9 | 351.8 | 152.1 |
| 2 | A-12 | 30 | 30 | 590.9 | 353.3 | 235.6 |
| 3 | C-5 | 19 | 19 | 444.4 | 226.2 | 218.2 |
| 3 | D-3 | 18 | 18 | 292.8 | 40.2 | 252.8 |
| 3 | A-5 | 19 | 19 | 354.0 | 99.3 | 254.7 |

The above test data clearly establish that the improved electronic control system of the invention produced an overall reduction in running time of 53.6% for the conveyors tested. This is indeed significant and would result in substantial savings in cost of electrical power as well as an advance for energy conservation.

As will be apparent to those skilled in the art, the present invention provides an electric control for conveying systems which not only reduces the electrical energy required for the running of the conveyors but also prolongs the useful life of the equipment and reduces its overall maintenance. The noise level normally attendant or associated with such apparatus is also lowered. In addition to reduction in direct energy employed, the intermittent operation of the conveyors would also reduce the demand charges appreciably. While the conveying system of the invention is particularly adapted for handling mail, it should, of course, be understood that the novel electronic control module of the invention could be incorporated into any conveying system. Thus, the control circuitry of the invention has been found to be particularly suitable for use in conveying systems for crude ores and minerals. Also, while specific apparatus embodiments have been disclosed for illustrative purposes, it is expressly intended that same should not be considered as limiting the invention thereto. For example, the three conveyor belt configurations shown in FIG. 1 may comprise only a single conveyor whose control functions are tied to processing equipment, such as a materials balance flow regulator, positioned downstream of the conveyor. The invention will be further defined by the following claims.

What is claimed is:

1. A conveying system comprising a plurality of conveyors adapted to move an object from one point to another; electric power means for driving each conveyor, said power means comprising a motor and a starter for controlling said motor, said starter having a starting contact and a stopping contact; photosensing means positioned near the leading ends of each conveyor for sensing the approach of an object to be conveyed; electric control means for said conveying system, said control means comprising separate electrical circuits for each conveyor and timing means in operative electrical association with each of said circuits, said separate circuits being operably interrelated so that the overall functions of the conveying systems are correlated and represent said single control means; each of said photosensors being adapted through said electric circuits to operate the starting contacts of the power means for each of said circuits in response to a change in condition initiated by the approach of the object to be conveyed, said timing means being adapted through said electric circuits to time each object being conveyed to traverse the length of the conveyor and to shut down, through said stopping contact of said power means, the conveyor when the object has traversed its length; said timing means further including, in operative relationship with said electrical circuits, a memory providing for time accumulation such that, should a conveyor be caused to stop in response to an electrical function in said circuits, each timer would hold its accumulated time and upon contact of said conveyor, would resume its time function and cause said conveyor to run for the unexpired portion of said preset time cycle; each of said circuits further including a time delay relay, each relay being operably associated with a photosensor positioned at the leading edge of an adjacent downstream conveyor and adapted to stop the conveyor associated with the given circuit and through said stopping contact of said power means, in response to the blocking of said photosensor for a period in excess of the preset time limit.

2. The conveying system in accordance with claim 1 wherein said conveyors comprise two or more belt conveyors operating in tandem and said timing means comprises a solid state electronic timer.

3. The conveying system in accordance with claim 2 and further comprising a traveling deflection plate positioned at the end of the last conveyor in the series and adapted to direct the object being conveyed into a receiving zone for further processing thereof.

4. In an electrical control system for a conveying apparatus including a plurality of conveyors adapted to move an object from one point to another; electric power means for driving said conveyors; photosensing means positioned near the leading ends of each conveyor for sensing the approach of an object to be conveyed; the improvement comprising electrical circuits for each conveyor and solid state timers in operative electrical association with each of said circuits, said circuits operably interrelated so that the overall functions of the conveying apparatus are correlated and form a single control for said apparatus; said photosensors being adapted through said electrical circuits to operate said power means for each of said conveyors in response to a change in condition initiated by the approach of the object to be conveyed, said timing means being adapted through said electric circuits to time each object being conveyed to traverse the length of the conveyor and to shut down the conveyor when the object has traversed its length; said timing means further including, in operative relationship with said electrical circuits, a memory providing for time accumulation such that, should a conveyor be caused to stop in response to an electrical function in said circuits, each timer would hold its accumulated time and would resume its time function upon restart of said conveyor to run for the unexpired portion of said preset time cycle, each of said circuits further including a time delay relay operably associated with a photosensor positioned at the leading edge of an adjacent downstream conveyor and adapted to stop the conveyor associated with the given circuit in response to the blocking of said photosensor for a period in excess of the preset time limit of said time delay relay.

5. The electrical control system in accordance with claim 4 and further comprising a start stop pushbutton control, a series ready light and individual interlock relays which place said electrical circuitry in readiness to respond to input signals from said photosensors.

* * * * *